United States Patent Office.

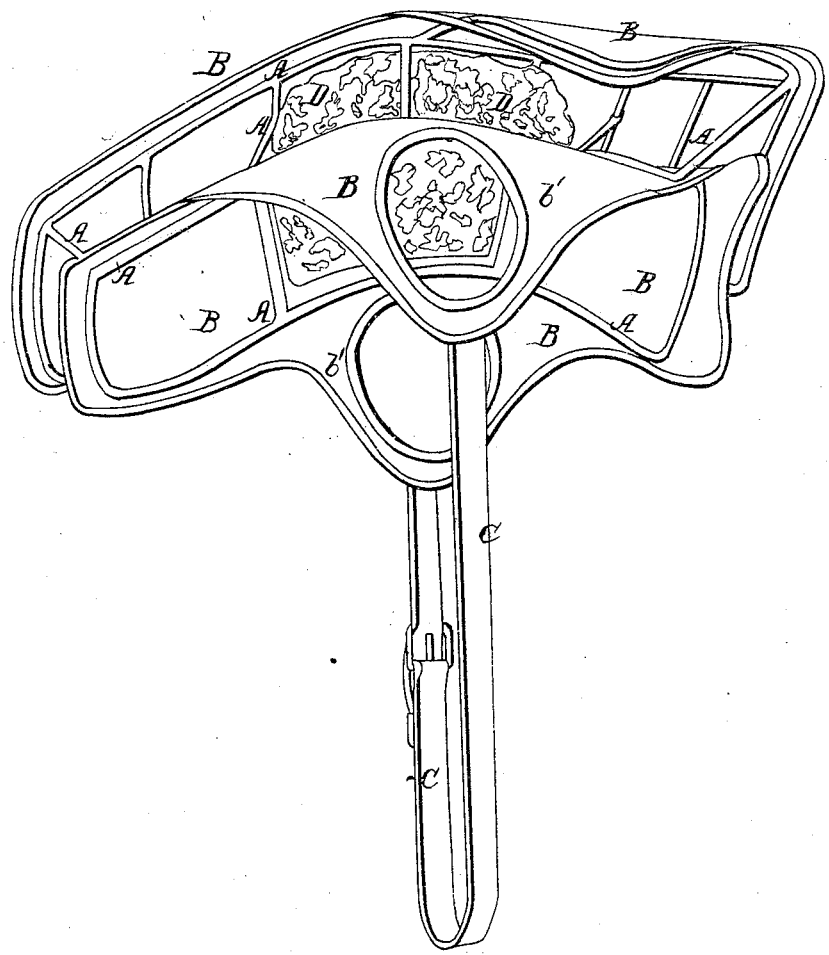

J. L. McINTOSH, OF BROOKLYN, NEW YORK.

Letters Patent No. 93,325, dated August 3, 1869.

IMPROVEMENT IN SUN-SHADES FOR HORSES.

The Schedule referred to in these Letters Patent and making part of the same.

*To all whom it may concern:*

Be it known that I, J. L. McINTOSH, of the city of Brooklyn, in the county of Kings, and State of New York, have invented a new and improved Horse-Bonnet; and I do hereby declare that the following is a full, clear, and exact description thereof, which will enable others skilled in the art to make and use the same, reference being had to the accompanying drawing, forming part of this specification.

The figure is a perspective view of my improved horse-bonnet.

My invention has for its object to furnish an improved bonnet for protecting the horse from sun-stroke, by keeping his head cool and protecting it from the heat of the sun; and It consists in the bonnet constructed in the manner hereinafter more fully described.

A is the wire frame, which is made of wire of such a size as to give sufficient strength and stability to the bonnet, and at the same time to make it sufficiently light.

The frame A consists of an upper and lower part, connected to each other and held in their proper relative positions by cross or stay-wires, as shown in the drawing. The upper and lower parts of the frame A are arranged at such a distance apart as to allow the air to have a free circulation through the bonnet.

The frame A is covered upon its upper and lower sides with canvas, B, or other suitable material, and is so formed as to fit upon the horse's head.

The sides of the lower covering are extended downward to form flaps, b', or have flaps attached to them, said flaps having holes formed through them for the passage of the horse's ears, and the bonnet is secured to the horse's head by a single light strap, C, passing beneath his throat. This construction allows the bonnet to be worn with ear-nets, when desired, or the said ear-nets may be attached to the bonnet.

In very hot days a wet sponge, D, may be placed in the middle part of the frame A, the middle cross or stay-wires being so arranged as to form a receptacle for said sponge, at the same time that they support and strengthen the said frame A.

For convenience in putting in and taking out the sponge, a hole may be cut in the upper or lower canvas or covering B. I prefer to cut this hole in the lower canvas, as it allows the wet sponge to come into direct contact with the horse's head. In case the cut is made in the upper covering, it should be covered with a flap. By this construction of the bonnet, the motion of the horse and the form of the bonnet will cause a current of air to pass continuously through it, keeping the horse's head constantly cool.

When the wet sponge is placed in the bonnet, the current of air passing through the bonnet will carry off the vapor as it forms from the evaporization of the water, and thus prevent the sponge from getting warm.

Having thus described my invention,

What I claim as new, and desire to secure by Letters Patent, is—

1. The wire frame A, covered with canvas or other suitable material, and adapted to fit upon a horse's head, substantially as herein shown and described, and for the purpose set forth.

2. The combination of the sponge D with the bonnet A B, substantially as herein shown and described, and for the purpose set forth.

The above specification of my invention signed by me, this 26th day of May, 1869.

J. L. McINTOSH.

Witnesses:
FRANK BLOCKLEY,
JAMES T. GRAHAM.